United States Patent
Sato et al.

(10) Patent No.: US 6,670,078 B1
(45) Date of Patent: Dec. 30, 2003

(54) NON-AQUEOUS ELECTROLYTE CELL WITH A SOLVENT INCLUDING A S-O BOND

(75) Inventors: Tomohiro Sato, Ami-machi (JP); Shoichiro Mori, Ami-machi (JP); Marc Deshamps, Ami-machi (JP); Minoru Kotato, Ami-machi (JP); Noriko Shima, Ami-machi (JP); Hitoshi Suzuki, Ami-machi (JP)

(73) Assignee: Mitsubishi Chemical Corporation, Tokyo (JP)

(*) Notice: Subject to any disclaimer, the term of this patent is extended or adjusted under 35 U.S.C. 154(b) by 0 days.

(21) Appl. No.: 09/508,108

(22) PCT Filed: Sep. 17, 1998

(86) PCT No.: PCT/JP98/04181

§ 371 (c)(1),
(2), (4) Date: Jul. 19, 2000

(87) PCT Pub. No.: WO99/16144

PCT Pub. Date: Apr. 1, 1999

(30) Foreign Application Priority Data

Sep. 19, 1997 (JP) ............................... 9/254802
Oct. 13, 1997 (JP) ............................... 9/278626
Apr. 22, 1998 (JP) ............................ 10/111794

(51) Int. Cl.$^7$ ............................................. H01M 6/16
(52) U.S. Cl. ................................................. 429/340
(58) Field of Search ........................ 429/340; 252/62.1

(56) References Cited

U.S. PATENT DOCUMENTS

| | | | | |
|---|---|---|---|---|
| 4,048,403 A | * | 9/1977 | Kronrnberg | 429/194 |
| 4,104,450 A | * | 8/1978 | Whitney | 429/194 |
| 4,293,623 A | * | 10/1981 | Klemann | 429/194 |
| 4,444,855 A | * | 4/1984 | Dey | 429/48 |
| 4,528,254 A | * | 7/1985 | Wolf | 429/197 |
| 4,550,064 A | * | 10/1985 | Yen | 429/94 |
| 4,808,497 A | * | 2/1989 | Blomgren | 429/194 |
| 4,844,996 A | * | 7/1989 | Peled | 429/194 |
| 5,114,811 A | * | 5/1992 | Ebel | 429/194 |
| 5,260,145 A | * | 11/1993 | Armand | 429/50 |
| 5,626,981 A | * | 5/1997 | Simon | 429/105 |
| 5,648,011 A | * | 7/1997 | Blonsky | 252/62.2 |
| 6,033,809 A | * | 3/2000 | Hamamoto | 429/340 |

FOREIGN PATENT DOCUMENTS

| | | | | |
|---|---|---|---|---|
| JP | 62100948 | * | 5/1987 | H01M/10/40 |
| JP | 62-108474 | | 5/1987 | |
| JP | 3-152879 | | 6/1991 | |
| JP | 403152879 A | * | 6/1991 | H01M/10/40 |
| JP | 5-290854 | | 11/1993 | |
| JP | 5-307974 | | 11/1993 | |
| JP | 5-307974 A | * | 11/1993 | H01M/10/40 |
| JP | 6-231754 | | 8/1994 | |
| JP | 6-302336 | | 10/1994 | |
| JP | 7-122295 | | 5/1995 | |
| JP | 07122295 A | * | 5/1995 | H01M/10/40 |
| JP | 8-096851 | | 4/1996 | |
| JP | 9-050823 | * | 2/1997 | |
| JP | 9-120837 | | 5/1997 | |
| JP | 9-147814 | | 6/1997 | |

\* cited by examiner

*Primary Examiner*—Patrick Ryan
*Assistant Examiner*—Mark Ruthkosky
(74) *Attorney, Agent, or Firm*—Oblon, Spivak, McClelland, Maier & Neustadt, P.C.

(57) ABSTRACT

A nonaqueous electrolytic solution cell having a negative electrode containing lithium as an active material, a positive electrode, a nonaqueous electrolytic solution consisting of solute and organic solvent, a separator, and an outer can, wherein the organic solvent contains a compound having an S—O bond, and a current collector for the positive electrode and an electrolytic solution-contacting portion on the positive electrode side of the outer can are made of valve metal or alloy thereof is disclosed. The nonaqueous electrolytic solution cell of the present invention is excellent in low-temperature characteristics and long-term stability, and also in cycle characteristics for use as a secondary battery.

27 Claims, 6 Drawing Sheets

NON-AQUEOUS ELECTROLYTE CELL WITH A SOLVENT INCLUDING A S-O BOND

FIELD OF THE INVENTION

This invention relates to a nonaqueous electrolytic solution cell with excellent low-temperature characteristics, long-term stability and high energy density.

RELATED ART

Along with recent trends in weight and size reductions of electric appliances, attention to a lithium cell has been growing due to its high energy density. And along with diversification of lithium cell applications, it has been needed to improve the cell characteristics.

As solvent for an electrolyte of the lithium cell, widely used is nonaqueous organic solvent including carbonates such as, for example, ethylene carbonate, propylene carbonate, diethyl carbonate or γ-butyrolactone; and esters.

Among these, propylene carbonate has an excellent property as a main solvent of the electrolyte, since it has a high dielectric constant, well dissolves lithium salts as a solute (electrolyte), and shows a high electric conductivity even at low temperatures. Independent use of propylene carbonate may, however, excessively increase viscosity of the electrolyte, which may degrade the discharging characteristics in particular at low temperatures. While a mixed solvent of propylene carbonate and 1,2-dimethoxyethane has been proposed, the long-term stability and safety still remain in problem due to a relatively low boiling point 1,2-dimethoxyethane.

As for secondary battery using propylene carbonate, a problem of gas generation may arise depending on types of the electrode materials. For example, it is known that, when a variety of graphitic electrode materials is used singly, or mixed material of graphitic electrode material and an electrode material capable of liberating lithium is used for a negative electrode, propylene carbonate is vigorously decomposed on the surface of the graphitic electrode, thereby to prevent lithium from being smoothly occluded into or liberated from the graphitic electrode (7th International Symposium on Li Batteries, p.259, 1995).

Thus use of ethylene carbonate as a solvent for the electrolytic solution came into recent trend, since it is less causative of such decomposition reaction. Ethylene carbonate has a solidification point (36.4° C.) higher than that of propylene carbonate, so that it is not used singly but in combination with low-viscosity solvents which include dialkyl carbonates such as dimethyl carbonate and diethyl carbonate; dimethoxyethane; and dioxolane ("Kino Zairyo (Functional Materials)", Vol.15, April, p.48, 1995). The low-viscosity solvents are, however, generally low in boiling points, which raises apprehension that inner pressure of the cell will increase when they are added in a large amount, thereby to degrade safety due to solvent leakage. Problems on solidification of the electrolytic solution and a low electric conductivity under low temperatures are also frequently encountered. Although a mixed solution of ethylene carbonate and diethyl carbonate or the like is used as an electrolytic solution for lithium secondary batteries in such situation, such batteries still suffer from insufficient cycle characteristics.

To solve these problems, it has been proposed to use sulfite compounds as the solvent (e.g., Japanese Unexamined Patent Publications No. 06-302336, No. 07-122295, No. 08-96851 and No. 09-120837). In these publications, it is reported that the electrolytic solution using sulfite compounds are high in electric conductivity and low in viscosity, and thus exhibits excellent cell characteristics at low temperatures. It has also been proposed to use sulfolane compounds as the solvent in terms of improving cycle characteristics of secondary batteries (e.g., Japanese Unexamined Patent Publication No. 03-152879).

Malfunctions of the batteries have, however, been found out when the sulfite compounds or sulfolane compounds, each having an S—O bond, are used for the electrolytic solution. It is, in particular, demonstrated as a marked degradation in the cycle characteristics of secondary batteries, and there is a room for further improvements before the practical use.

Referring to such situation of the conventional technologies, it is therefore an object of the present invention to select preferable compounds as a solvent for nonaqueous electrolytic solution and find out conditions under which the functions of the solvent is fully exerted in the cell. More specifically, it is an object of the present invention to provide a nonaqueous electrolytic solution cell excellent in low-temperature characteristics and long-term stability, and also in cycle characteristics particularly for use as a secondary battery.

SUMMARY OF THE INVENTION

After extensive investigations to achieve such objects, the inventors of the present invention found out that a nonaqueous electrolytic solution cell with quite excellent characteristics can be obtained by properly selecting, as a solvent for the nonaqueous electrolytic solution, specific compounds having S—O bonds, and by properly determining materials for composing the current collector and outer can with which the electrolytic solution will contact.

Thus the present invention provides a nonaqueous electrolytic solution cell comprising a negative electrode containing lithium as an active material, a positive electrode, a nonaqueous electrolytic solution consisting of solute and organic solvent, a separator, and an outer can; the organic solvent containing at least one of compounds represented by the formula (1):

(in which, $R_1$ and $R_2$ independently represent an alkyl group which may be substituted with an aryl group or halogen atom; an aryl group which may be substituted with an alkyl group or halogen atom; or may be taken together to form, together with —A—, a cyclic structure which may contain an unsaturated bond, where "A" being represented by any one of the formulae (2) to (5)):

-continued

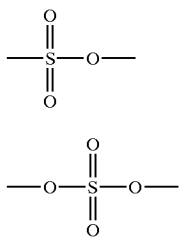

and, a current collector for the positive electrode and an electrolytic solution-contacting portion on the positive electrode side of the outer can being made of valve metal or alloy thereof.

Compounds represented by the formula (1) are exemplified as ethylene sulfite, dimethyl sulfite, sulfolane, sulfolene and 1,3-propane sultone. A preferable example of the organic solvent can be a mixture of ethylene sulfite and propylene carbonate. Examples of the electrolyte are $LiClO_4$, $LiPF_6$, $LiBF_4$, $LiCF_3SO_3$, $LiN(CF_3SO_2)_2$, $LiN(CF_3CF_2SO_2)_2$, $LiN(CF_3SO_2)(C_4F_9SO_2)$ and $LiC(CF_3SO_2)_3$. The concentration of the solute is preferably about 0.5 to 2.0 mol/litter.

The valve metal and alloy thereof used in the present invention are preferably Al, Ti, Zr, Hf, Nb, Ta or alloys containing these metals, where Al or Al alloy is more preferable. Materials for the negative electrode can be selected from carbonaceous materials such as graphite capable of occluding and liberating lithium; metal oxide materials capable of occluding and liberating lithium; lithium metal; and lithium alloy. In particular, preferably used is a carbonaceous material having a "d" value for lattice plane (002) in X-ray diffractometry of 0.335 to 0.37 nm, more preferably 0.335 to 0.34 nm. Materials for the positive electrode can be selected from lithium-transition metal composite oxide material capable of occluding and liberating lithium; transition metal oxide material; and carbonaceous material.

For the case that the cell of the present invention is used as a secondary battery, it is preferable to apply current pulses at the initial charging. The applied pulses are preferably of rectangular wave with a constant current value of 0.01 to 100 A per one gram of the active material for the negative electrode, a pulse width of 0.01 to 300 seconds, a pulse separation of 0.1 to 300 seconds, and a pulse count of 10 to 1000 counts.

PREFERRED EMBODIMENTS OF THE INVENTION

Figure 1:
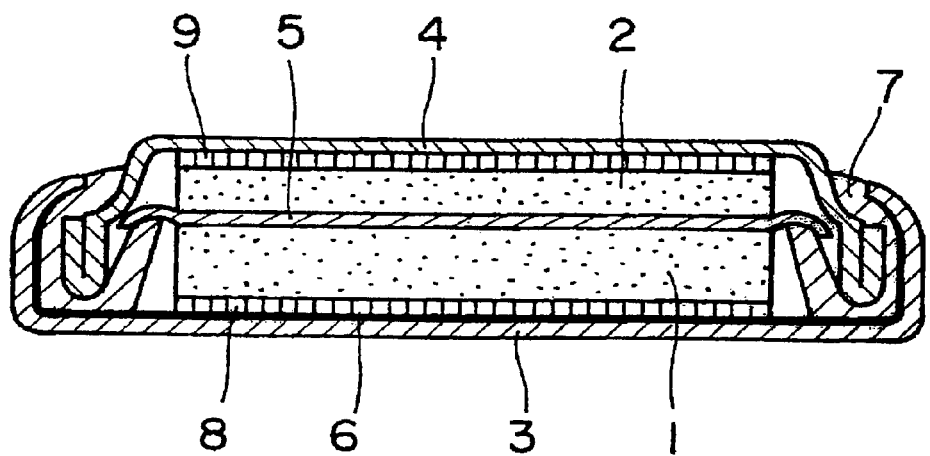
FIG. 1 is a sectional view showing a structural example of a coin-shaped cell, in which numeral 1 denotes a positive electrode, 2 denotes a negative electrode, 3 denotes a positive can (outer can), 4 denotes a seal plate, 5 denotes a separator, 6 denotes an Al foil, 7 denotes a gasket, 8 denotes a current collector for the positive electrode and 9 denotes a current collector for the negative electrode.

Preferred embodiments of the nonaqueous electrolytic solution cell of the present invention will be detailed hereinafter.

The nonaqueous electrolytic solution cell of the present invention essentially contains, as the organic solvent for the electrolytic solution, at least one compound represented by the formula (1).

$R_1$ and $R_2$ of the compound represented by the formula (1) independently represent an alkyl group which may be substituted with an aryl group or halogen atom; an aryl group which may be substituted with an alkyl group or halogen atom; or may be taken together to form, together with —A—, a cyclic structure which may contain an unsaturated bond.

$R_1$ or $R_2$ can be an alkyl group preferably having 1 to 4 carbon atoms, which are specifically exemplified as a methyl group, ethyl group, propyl group, isopropyl group and butyl group. Examples of an aryl group capable of substituting the alkyl group include phenyl group, naphthyl group and anthranyl group, among these phenyl group being more preferable. Preferable examples of a halogen atom capable of substituting the alkyl group include fluorine atom, chlorine atom and bromine atom. A plurality of these substituents may substitute the alkyl group, and a concomitant substitution by an aryl group and halogen group is also allowable.

The cyclic structure formed by $R_1$ and $R_2$ bound with each other and together with —A— is of four-membered or larger ring, and may contain a double bond or triple bond. Examples of bound group formed by $R_1$ and $R_2$ bound with each other include $—CH_2—$, $—CH_2CH_2—$, $—CH_2CH_2CH_2—$, $—CH_2CH_2CH_2CH_2—$, $—CH_2CH_2CH_2CH_2CH_2—$, $—CH=CH—$, $—CH=CHCH_2—$, $—CH=CHCH_2—$, $—CH_2CH=CHCH_2—$ and $—CH_2CH_2C≡CCH_2CH_2—$. One or more hydrogen atoms in these groups may be substituted by alkyl group(s), halogen atom(s) aryl group(s) and so forth.

Specific examples of the compound having "A" as represented by the formula (2) include chain sulfites such as dimethyl sulfite, diethyl sulfite, ethyl methyl sulfite, methyl propyl sulfite, ethyl propyl sulfite, diphenyl sulfite, methyl phenyl sulfite, ethyl sulfite, dibenzyl sulfite, benzyl methyl sulfite and benzyl ethyl sulfite; cyclic sulfites such as ethylene sulfite, propylene sulfite, butylene sulfite, vinylene sulfite, phenylethylene sulfite, 1-methyl-2-phenylethylene sulfite and 1-ethyl-2-phenylethylene sulfite; and halides of such chain and cyclic sulfites.

Specific examples of the compound having "A" as represented by the formula (3) include chain sulfones such as dimethyl sulfone, diethyl sulfone, ethyl methyl sulfone, methyl propyl sulfone, ethyl propyl sulfone, diphenyl sulfone, methyl phenyl sulfone, ethyl phenyl sulfone, dibenzyl sulfone, benzyl methyl sulfone and benzyl ethyl sulfone; cyclic sulfones such as sulfolane, 2-methyl sulfolane, 3-methyl sulfolane, 2-ethyl sulfolane, 3-ethyl sulfolane, 2,4-dimethyl sulfolane, sulfolene, 3-methyl sulfolene, 2-phenyl sulfolane and 3-phenyl sulfolane; and halides of such chain and cyclic sulfones.

Specific examples of the compound having "A" as represented by the formula (4) include chain sulfonic acid esters such as methyl methanesulfonate, ethyl methanesulfonate, propyl methanesulfonate, methyl ethanesulfonate, ethyl ethanesulfonate, propyl ethanesulfonate, methyl benzenesulfonate, ethyl benzenesulfonate, propyl benzenesulfonate, phenyl methanesulfonate, phenyl ethanesulfonate, phenyl propanesulfonate, methyl benzylsulfonate, ethyl benzylsulfonate, propyl benzylsulfonate, benzyl methanesulfonate, benzyl ethanesulfonate and benzyl propanesulfonate; cyclic sulfonic acid esters such as 1,3-propanesultone, 1,4-butanesultone, 3-phenyl-1,3-propanesultone and 4-phenyl-1,4-butanesultone; and halides of such chain and cyclic sulfonic acid esters.

Specific examples of the compound having "A" as represented by the formula (5) include chain sulfuric acid esters such as dimethyl sulfate, diethyl sulfate, ethyl methyl sulfate, methyl propyl sulfate, ethyl propyl sulfate, methyl phenyl sulfate, ethyl phenyl sulfate, phenyl propyl sulfate, benzyl methyl sulfate and benzyl ethyl sulfate; cyclic sulfuric acid esters such as ethylene glycol sulfuric ester, 1,2-propanediol sulfuric ester, 1,3-propanediol sulfuric ester, 1,2-butanediol sulfuric ester, 1,3-butanediol sulfuric ester, 2,3-butanediol sulfuric ester, phenylethylene glycol sulfuric ester, methylphenylethylene glycol sulfuric ester and ethylphenylethylene glycol sulfuric ester; and halides of such chain and cyclic sulfuric acid esters.

The compound represented by the formula (1) maybe used singly, or two or more of such compounds may be used in combination. When two or more compounds are used in combination, those having different structures of "A" may be used in a mixed manner.

Amount of the compound represented by the formula (1) contained in the organic solvent of the nonaqueous electrolytic solution is preferably within a range from 0.05 to 100 vol %. Some of the compounds represented by the formula (1) are solid in the room temperature, such compounds preferably being used at an amount equal to or lower than the saturation solubility for the organic solvent used, and more preferably at 60 wt % of the saturation solubility or lower, and still more preferably at 30 wt % or lower. A content of the compound represented by the formula (1) of less than 0.05 vol % tends to result in ambiguous effect of the present invention. Here in this specification, numerical ranges depicted with "from" and "to" include both end values.

As the organic solvent of the nonaqueous electrolytic solution, solvents other than those represented by the formula (1) may also be used, and examples of which include cyclic carbonates such as ethylene carbonate, propylene carbonate and butylene carbonate; chain carbonates such as dimethyl carbonate, diethyl carbonate and ethyl methyl carbonate; cyclic esters such as γ-butyrolactone and γ-valerolactone; chain esters such as methyl acetate and methyl propionate; cyclic ethers such as tetrahydrofuran, 2-methyl tetrahydrofuran and tetrahydropyran; chain ethers such as dimethoxyethane and dimethoxymethane; cyclic phosphoric acid esters such as ethylene methyl phosphate and ethyl ethylene phosphate; chain phosphoric acid esters such as trimethyl phosphate and triethyl phosphate; halides thereof; and sulfur-containing organic solvents other than those represented by the formula (1). The organic solvent may be used singly, or two or more of such solvents may be used in combination.

Among these, more preferable to use is propylene carbonate. Propylene carbonate is advantageous in that having a high dielectric constant, well dissolving lithium salt solutes, and showing a high electric conductivity even at low temperatures. Content of propylene carbonate in the mixed solvent for the nonaqueous electrolytic solution is preferably from 40 to 99.95 vol %, more preferably from 50 to 99.9 vol %, and still more preferably from 85 to 99.9 vol %. Content of the compound represented by the formula (1) is preferably from 0.05 to 60 vol %, more preferably from 0.1 to 50 vol %, and still more preferably from 0.1 to 15 vol %.

A mixed solvent of propylene carbonate and ethylene sulfite is exemplified as of a typical combination. A problem has been residing as for a secondary battery having a negative electrode made of graphitic electrode material such that propylene carbonate is vigorously decomposed on the surface of the graphitic electrode, thereby to prevent lithium from being smoothly occluded into or liberated from the graphitic electrode. On the other hand, using propylene carbonate as combined with ethylene sulfite according to the present invention allows formation of a quite stable protective film on the surface of the graphitic electrode prior to lithium occlusion, thereby to suppress the decomposition of the electrolytic solution at a minimum level. Lithium thus can smoothly occluded into or liberated from the graphitic electrode.

Examples of the solute used for the nonaqueous electrolytic solution are inorganic lithium salts such as $LiClO_4$, $LiPF_6$, $LiBF_4$; and fluorine-containing organic lithium salts such as $LiCF_3SO_3$, $LiN(CF_3SO_2)_2$, $LiN(CF_3CF_2SO_2)_2$, $LiN(CF_3SO_2)(C_4F_9SO_2)$ and $LiC(CF_3SO_2)_3$. These solutes may be used singly or in combination of two or more. Molar concentration of the lithium salt as a solute in the electrolytic solution is preferably within a range from 0.5 to 2.0 mol/l. A molar concentration less than 0.5 mol/l or exceeding 2.0 mol/l results in a lower electric conductivity of the electrolytic solution, which tends to degrade cell characteristics.

The negative electrode composing the nonaqueous electrolytic solution cell of the present invention is such that using lithium as an active material. In this specification, "using lithium as an active material" means that lithium metal, lithium compound or lithium ion is responsible for the electrode reaction. Materials for composing the negative electrode include, for example, carbonaceous materials capable of occluding and liberating lithium such as decomposition products obtained by thermal decomposition of organic substances under a variety of conditions, hard (non-graphitizable) carbon, artificial graphite and natural graphite; metal oxide materials capable of occluding and liberating lithium such as stannic oxide and silicon oxide; lithium metal; and various lithium alloys. These materials may be used singly or in combination of two or more.

When the graphitic carbonaceous materials are used, it is preferable to use an artificial graphite made from soft (graphitizable) pitch of various origins processed by high temperature annealing; purified natural graphite; or these graphites subjected to a variety of surface processings with, for example, pitch. These graphitic carbonaceous materials generally have a "d" value (interlayer distance) for lattice plane (002) of 0.335 to 0.37 nm in X-ray diffractometry according to the Gakushin-ho method (a method authorized by Japan Society for the Promotion of Science, see "Tanso Zairyo Nyumon (A Guide to Carbon Materials)", Carbon Material Society, 1972, p.184–192), and more preferably 0.335 to 0.35 nm, still more preferably 0.335 to 0.34 nm, and most preferably 0.335 to 0.337 nm. Ash content of these graphitic carbonaceous materials is generally 1.5 wt % or lower, and more preferably 1 wt % or lower, still more preferably 0.5 wt % or lower, and most preferably 0.1 wt % or lower. Crystallite size determined by the X-ray diffractometry according to the Gakushin-ho method is generally 1.5 nm or larger, more preferably 30 nm or larger, still more preferably 50 nm or larger, and most preferably 100 nm or larger. Median diameter determined by the laser diffraction and scattering method is preferably within a range from 1 to 100 $\mu$m, more preferably from 3 to 50 $\mu$m, still more preferably from 5 to 40 $\mu$m, and most preferably from 7 to 30 $\mu$m.

Specific surface area of the graphitic carbonaceous materials determined by the BET method is generally within a range from 0.5 to 70.0 $m^2/g$, more preferably from 0.5 to 25.0 $m^2/g$, still more preferably from 0.7 to 10.0 $m^2/g$, still further preferably from 1.0 to 7.0 $m^2/g$, and most preferably from 1.5 to 5.0 $m^2/g$. In Raman spectrum analysis using argon ion laser, it is preferable that peak $P_A$ (peak intensity $I_A$) within a wavelength range from 1580 to 1620 $cm^{-1}$ and peak PB (peak intensity $I_B$) within a wavelength range from 1350 to 1370 $cm^{-1}$ are observed at an intensity ratio R ($=I_B/I_A$) of 0 to 0.7 in general, preferably at 0 to 0.5, and a half width of the peak within a range from 1580 to 1620 $cm^{-1}$ is 26 $cm^{-1}$ or less, and more preferably 25 $cm^{-1}$ or less.

There is no restriction on the method of fabricating the negative electrode using these negative electrode materials. For example, a negative electrode material is added, as required, with a binder, conductive material, solvent, etc. to prepare a slurry, and the slurry is then coated on a substrate of a current collector, which is followed by drying to produce the electrode. Also, such electrode materials may be subjected to roll forming or compression molding to be fabricated into a sheet or pellet, respectively.

Types of the binder used for the fabrication of the electrode is not particularly limited as far as it is stable to the solvent and electrolytic solution used in the fabrication of the electrode. Examples of the binder include resinous polymers such as polyethylene, polypropylene, polyethylene terephthalate, aromatic polyamide, and cellulose; rubbery polymers such as styrene-butadiene rubber, isoprene rubber, butadiene rubber, and ethylene-propylene rubber; thermoplastic elastomeric polymers such as styrene-butadiene-styrene block copolymer and its hydrogenated product, styrene-ethylene-butadiene-styrene block copolymer and its hydrogenated product, and styrene-isoprene-styrene block copolymer and its hydrogenated product; flexible resinous polymers such as syndiotactic 1,2-polybutadiene, ethylene-vinyl acetate copolymer, and propylene-α-olefin (having 2 to 12 carbon atoms) copolymer; and fluorocarbon polymers such as polyvinylidene fluoride, polytetrafluoroethylene, and polytetrafluoroethylene-ethylene copolymer.

As the binder, there can be used a polymer composition having alkali metal ion (lithium ion, in particular) conductivity. As such ion conductive polymer compositions, there may be used a composite system made of polymeric compound as combined with lithium salt or with alkali metal salt consisting essentially of lithium, where the polymeric compound includes polyether polymeric compounds such as polyethylene oxide and polypropylene oxide; crosslinked polymeric compounds of polyether; polyepichlorohydrin; polyphosphazene; polysiloxane; polyvinyl pyrrolidone; polyvinylidene carbonate and polyacrylonitrile; or a system comprising these polymeric compounds mixed with organic compounds having a high dielectric constant, such as propylene carbonate, ethylene carbonate or γ-butyrolactone. These materials may also be used in combination.

The negative electrode material and the binder may be mixed in various manners. For example, particles of both of them are mixed, or particles of the negative electrode material are entangled with fibrous binder to form a mixture, or a layer of the binder is deposited on the surface of the particles. Mixing ratio of the binder to the particle of the negative electrode material is preferably 0.1 to 30 wt % of the negative electrode material, and more preferably 0.5 to 10 wt %. Addition of the binder at an amount exceeding 30 wt % tends to raise the internal resistance of the electrode, and less than 0.1 wt %, on the other hand, tends to weaken the adhesive strength between the current collector and negative electrode material.

In mixing the negative electrode material and the binder, a conductive material may be mixed jointly. Since the conductive material used is not restricted in type, it may be a metal or a nonmetal. Examples of a metallic conductive material are those composed of metallic elements such as Cu or Ni. Examples of a nonmetallic conductive material are carbon materials such as graphite, carbon black, acetylene black, and Ketjen black. The mean particle diameter of the conductive material is preferably 1 $\mu$m or less.

Mixing ratio of the conductive material is preferably 0.1 to 30 wt % of the negative electrode material, and more preferably 0.5 to 15 wt %. By setting the mixing ratio of the conductive material at 30 wt % or less, the charge and discharge capacity of the electrode per unit volume can be made relatively high. When the mixing ratio of the conductive material is set at 0.1 wt % or more, a conduction path between the conductive materials can sufficiently be formed within the electrode.

The above-mentioned mixture containing at least the negative electrode material and the binder is applied onto the current collector in accordance with the purpose of use of the electrode. The shape of the current collector to which the mixture is applied is not restricted, but can be determined depending on the mode of use of the negative electrode, etc. For instance, a cylindrical, plate-like, or coiled current collector may be used. The material for the current collector is preferably metal such as copper, nickel and stainless steel, among which copper foil being more preferable due to its processability into a thin film and its inexpensiveness.

The application of the mixture to the current collector can be performed by means known to those skilled in the art. When the mixture is a slurry, it can be applied onto the current collector by means of a die coater or a doctor blade. The mixture in a pasty form can be applied onto the current collector by roller coating or the like. The mixture containing a solvent is dried to remove the solvent, whereby an electrode can be prepared.

The positive electrode material used in the nonaqueous electrolytic solution cell of the present invention is not restricted, and can properly be selected from those capable of occluding and liberating lithium, which are exemplified as composite oxide materials of lithium and transition metal such as lithium cobalt oxide, lithium nickel oxide and lithium manganese oxide; transition metal oxide materials such as manganese dioxide; and carbonaceous materials such as fluorinated graphite. More specifically, available are $LiFeO_2$, $LiCoO_2$, $LiNiO_2$, $LiMn_2O_4$ and their nonstoichiometric compounds, $MnO_2$, $TiS_2$, $FeS_2$, $Nb_3S_4$, $MO_3S_4$, $CoS_2$, $V_2O_5$, $P_2O_5$, $CrO_3$, $V_3O_3$, $TeO_2$ and $GeO_2$.

There is no particular restriction on the fabrication process of the positive electrode, and a similar method for negative electrode described above may be employed.

The current collector for the positive electrode used in the present invention is made of valve metal or its alloy. "Valve metal" in the context of this specification has the same meaning as is widely known, that is, the term means a metal capable of forming thereon a passivation film by anodization in an electrolytic solution. The valve metal include metals of Groups IIIa, IVa and Va (Groups 3B, 4B and 5B) of the Periodic Table and alloys containing these metals. More specifically, exemplified are Al, Ti, Zr, Hf, Nb, Ta and their alloys, and among these, Al, Ti, Ta and their alloys being more preferably used. Al and Al alloy are still more preferable thanks to their light weight and high energy density.

The valve metal is covered on its surface with an oxide film, so that it can prevent the compound represented by the formula (1) from being decomposed by oxidation at the portion contact with the electrolytic solution. On the contrary, using a metal material other than the valve metal, such as stainless steel, cannot prevent the oxidative decomposition reaction of a compound having an S—O bond. The present invention is thus effective in improving long-term storability for primary battery and cycle characteristics for secondary battery.

The valve metal or its alloy is also used to a solution-contacting portion of the outer can on the positive electrode side with which the electrolytic solution contacts. The valve metal or its alloy can compose the entire body of the outer can or protect only the solution-contacting portion. An example of the former relates to an outer can made of aluminum or aluminum alloy. An example of the latter relates to an outer can preferably made of stainless steel but protected with aluminum or aluminum alloy at the solution-contacting portion thereof. Methods for protecting with the valve metal include those using plating or foil attachment. Here, the term "outer can" in the context of this specification includes portions such as a lead wire enclosed within the cell and a safety valve which operates when the inner pressure of the cell increases.

There is no specific limitation on the source material or morphology of the separator used for the cell of the present invention. The separator serves to separate the negative electrode and the positive electrode so as to avoid their physical contact. The preferred separator has high ion permeability and a low electrical resistance. Materials for the separator is preferably selected from those excellent in stability against the electrolytic solution and in liquid holding properties. For example, nonwoven fabric or porous film made of polyolefins, such as polyethylene and polypropylene, is used as the separator, to which the electrolytic solution is impregnated.

Methods for fabricating the nonaqueous electrolytic solution cell using such nonaqueous electrolytic solution, negative electrode, positive electrode, outer can and separator, is of no specific limitation, and can properly be selected from those being generally employed. The nonaqueous electrolytic solution cell of the present invention may include, if necessary, a gasket, a sealing plate and a cell case besides such nonaqueous electrolytic solution, negative electrode, positive electrode, outer can and separator. A fabrication method thereof comprises, for example, placing the negative electrode on the outer can, providing an electrolytic solution and a separator thereon, placing a positive electrode thereon so as to be opposed to the negative electrode, and crimping these materials together with a gasket and a sealing plate, to form a cell. Shape of the cell is not restricted, where available shapes may be of cylinder type, in which sheet electrodes and the separator are wound up in spiral; cylinder type with an inside-out structure, in which pellet electrodes and the separator are combined; and coin type, in which pellet electrodes and the separator are stacked.

The nonaqueous electrolytic solution cell of the present invention is excellent in low temperature characteristics and long-term stability, and further in cycle characteristics when used as a secondary battery. When the nonaqueous electrolytic solution cell of the present invention is used as a secondary battery, it is preferable to use an organic solvent containing ethylene sulfite. It is also preferable to apply current pulses at the initial charging in terms of obtaining a high charge/discharge efficiency and discharge capacity in the early stage.

There is no specific limitation on waveform of the current pulses applied at the initial charging, where available waveforms include rectangular, triangular, sinusoidal or the like. A waveform obtained by superposing a DC bias current with current pulses is also available. Among these, the rectangular wave is more preferable in terms of simple current control.

Pulse current at the time of pulse charging using the rectangular waveform current is generally set, per one gram of the negative electrode, within a range from 0.01 to 100 A/g, and more preferably from 0.1 to 10 A/g. A pulse current less than 0.01 A/g or exceeding 100 A/g tends to reduce effects of the current pulse application.

Pulse width at the time of pulse charging using the rectangular waveform current is generally set within a range from 0.01 to 300 seconds, and more preferably from 0.1 to 60 seconds. A pulse width less than 0.01 seconds tends to reduce controllability of the current pulse application. A pulse width exceeding 300 seconds tends to assimilate the state to that with no pulse current and to reduce the effect.

Pulse separation at the time of pulse charging using the rectangular waveform current is generally set within a range from 0.1 to 300 seconds, and more preferably from 1 to 100 seconds. Pulse count of pulses at the time of pulse charging using the rectangular waveform current is generally set within a range from 10 to 1000 counts and more preferably from 50 to 500 counts.

Although the pulse current has to be applied in the early stage of the initial charging, charging with a constant current will be allowable after 5 to 80%, more preferably approx. 10 to 50%, of the charge capacity was charged with the pulse current.

The present invention will be explained in more detail with reference to the following examples. Materials, amounts of uses, ratios, operations and so forth described hereinafter are properly be altered without departing from the spirit of the present invention. The scope of the present invention, therefore, is not limited to specific examples described below.

EXAMPLES 1 to 13

$LiCoO_2$ (90 weight parts) as a positive electrode material was added with carbon black (6 weight parts) and polyfluorovinylidene (4 weight parts), and then dispersed with N-methyl-2-pyrrolidone to obtain a slurry. The slurry was uniformly coated on an aluminum foil of 20 $\mu$m thick, as a current collector for the positive electrode, dried, and the foil was punched into a predetermined shape to obtain a positive electrode.

On the other hand, artificial graphite powder (product of Timcal America Inc., product name: KS-44) (90 weight parts) as a negative electrode material was mixed with polyfluorovinylidene (10 weight parts), and then dispersed with N-methyl-2-pyrrolidone to obtain a slurry. The slurry was uniformly coated on a copper foil of 18 µm thick, as a current collector for the negative electrode, dried, and the foil was punched into a predetermined shape to obtain a negative electrode. The artificial graphite powder used above has a "d" value for lattice plane (002) in X-ray diffractometry of 0.336 nm, a crystallite size (Lc) of above 100 nm (264 nm), an ash content of 0.04 wt %, a median diameter determined by the laser diffraction and scattering method of 17 µm, a specific area determined by the BET method of 8.9 m$^2$/g, a peak intensity ratio $R=I_B/I_A$ in Raman spectrum using argon ion laser of 0.15, where $I_A$ being an intensity of peak $P_A$ observed within a wavelength range from 1580 to 1620 cm$^{-1}$ and $I_B$ being an intensity of peak $P_B$ observed within a wavelength range from 1350 to 1370 cm$^{-1}$, and a half width of the peak within a range from 1580 to 1620 cm$^{-1}$ of 22.2 cm$_{-1}$.

The electrolytic solution was prepared by using or mixing various solvents at ratios listed in Table 1 and by dissolving thereto a thoroughly dried lithium hexafluorophosphate (LiPF$_6$) as a solute to reach a concentration of 1 mol/litter under a dry argon atmosphere, where the various solvents include ethylene sulfite (ES) , dimethyl sulfite (DMS), sulfolane (SLA), sulfolene (SLE), 1,3-propanesulton (PSL), ethylene carbonate (EC) as a cyclic carbonate, diethyl carbonate (DEC) as a chain carbonate, γ-butyrolactone (GBL) as a cyclic ester, methyl propionate (MP) as a chain ester, tetrahydrofuran (THF) as a cyclic ether and dimethoxyethane (DME) as a chain ether.

Using such positive electrode, negative electrode and electrolytic solution, a coin-shaped nonaqueous electrolytic solution cell as shown in FIG. 1 was fabricated under the dry argon atmosphere. More specifically, a positive electrode 1 and negative electrode 2 were respectively housed in a positive electrode can (outer can) 3 and sealing plate 4, both of which made of stainless steel, and the both were then stacked via a separator 5 made of microporous polyethylene film impregnated with the electrolytic solution. Hereinabove, to compose the liquid-contacting portion on the positive electrode side with a valve metal, the inner wall of the positive electrode can 3 was previously coated with an aluminum foil 6. Thereafter the positive electrode can 3 and sealing plate 4 was crimped together with a gasket 7 to obtain the coin-shaped cell.

Comparative Examples 1 to 9

A coin-shaped cell was fabricated in a similar manner with the above Examples 1 to 5, and 10 to 13, except for that the positive electrode can 3 without the aluminum foil was used.

The cells obtained from Examples 1 to 13 and Comparative Examples 1 to 9 were individually subjected to a charge/discharge test at 25° C. with a constant current of 0.5 mA, a charge termination voltage of 4.2 V and a discharge termination voltage of 2.5 V. Charge capacities and discharge capacities at the first cycle of the individual cells were shown in Table 1. Changes in the discharge capacity per one gram of the negative electrode in relation to the charge/discharge cycles in Example 2 and Comparative Example 2 were shown in FIG. 2, and those for Example 13 and Comparative Example 9 were shown in FIG. 3.

TABLE 1

| | Solvent Composition (vol %) | Initial Charge Capacity (mAh/g) | Initial Discharge Capacity (mAh/g) |
|---|---|---|---|
| Example 1 | ES = 100 | 243 | 153 |
| Comparative Example 1 | ES = 100 | 1143 | 2 |
| Example 2 | ES:EC = 50:50 | 287 | 220 |
| Comparative Example 2 | ES:EC = 50:50 | 410 | 20 |
| Example 3 | ES:DEC = 50:50 | 230 | 90 |
| Comparative Example 3 | ES:DEC = 50:50 | 240 | 47 |
| Example 4 | ES:DEC = 20:80 | 310 | 192 |
| Comparative Example 4 | ES:DEC = 20:80 | 350 | 95 |
| Example 5 | ES:DEC = 1:99 | 250 | 176 |
| Comparative Example 5 | ES:DEC = 1:99 | 95 | 40 |
| Example 6 | ES:GBL = 50:50 | 262 | 128 |
| Example 7 | ES:MP = 50:50 | 273 | 182 |
| Example 8 | ES:THF = 50:50 | 297 | 228 |
| Example 9 | ES:DME = 50:50 | 273 | 203 |
| Example 10 | DMS:EC = 50:50 | 394 | 122 |
| Comparative Example 6 | DMS:EC = 50:50 | 598 | 87 |
| Example 11 | SLA:DEC = 50:50 | 363 | 219 |
| Comparative Example 7 | SLA:DEC = 50:50 | 358 | 185 |
| Example 12 | SLE:EC:DEC = 10:45:45 | 320 | 49 |
| Comparative Example 8 | SLE:EC:DEC = 10:45:45 | 206 | 0 |
| Example 13 | PSL:EC:DEC = 10:45:45 | 289 | 244 |
| Comparative Example 9 | PSL:EC:DEC = 10:45:45 | 281 | 231 |

Figure 2:
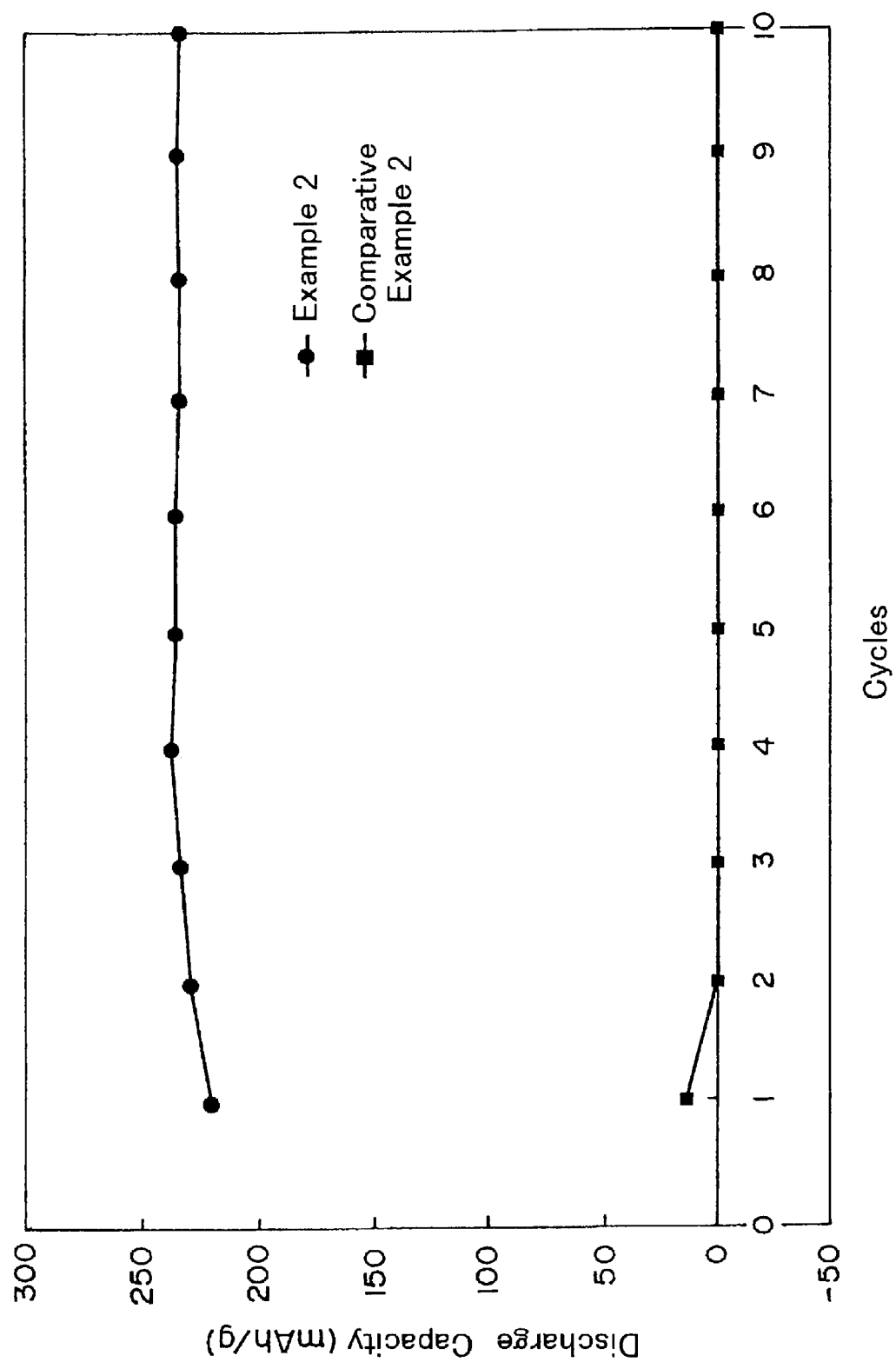
FIG. 2 is a diagram showing relations between charge/discharge characteristics and discharge capacity of the nonaqueous electrolytic solution cells of Example 2 of the present invention and Comparative Example 2.
Figure 3:
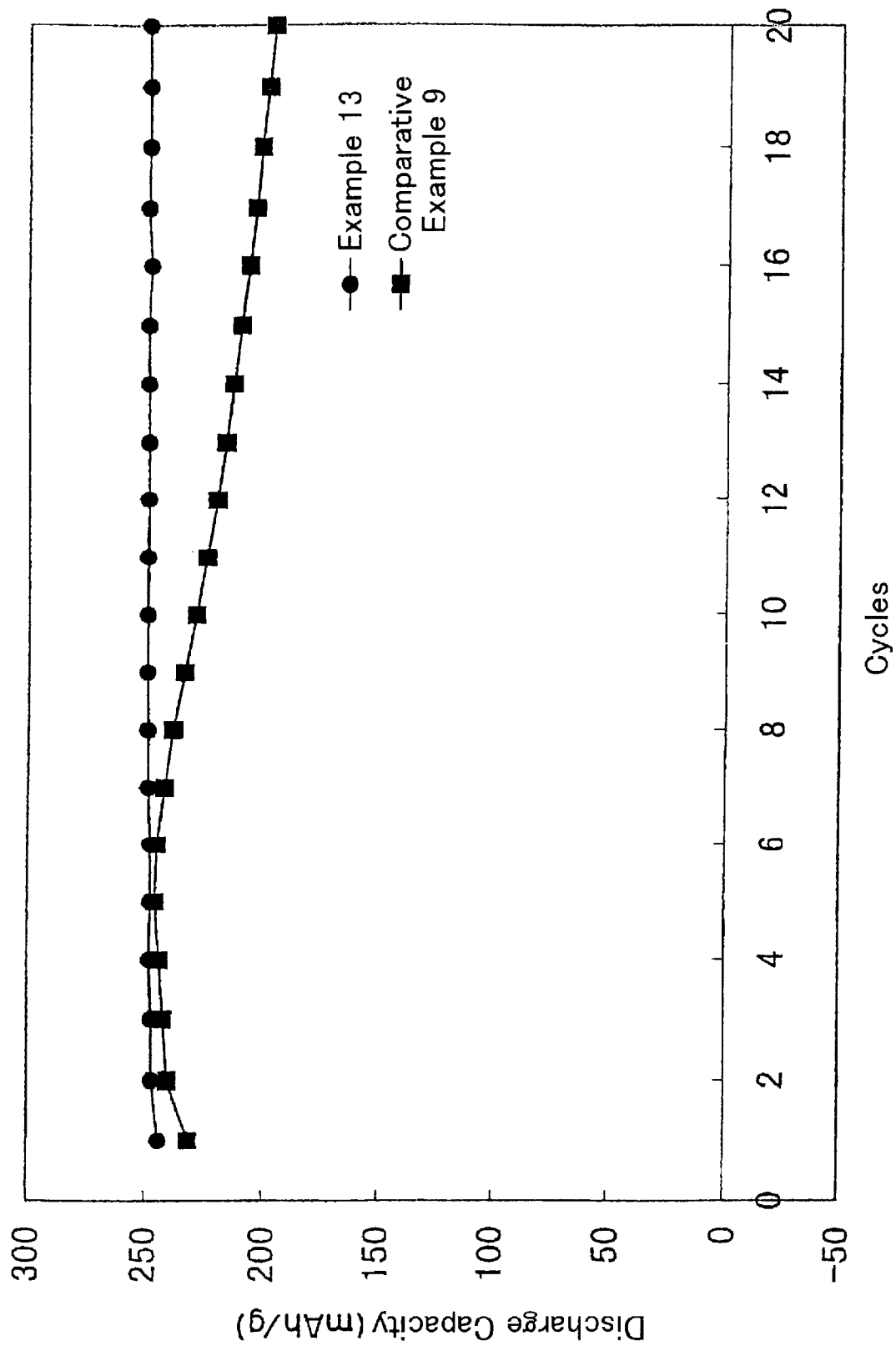
FIG. 3 is a diagram showing relations between charge/discharge characteristics and discharge capacity of nonaqueous electrolytic solution cells of Example 13 of the present invention and Comparative Example 9.

As is clear from Table 1, FIG. 2 and FIG. 3, the cells in which stainless steel is exposed to the liquid-contacting portion on the positive electrode side failed in obtaining sufficient discharge capacity since the oxidative decomposition reaction of the compound represented by the formula (1) contained in the electrolytic solution proceeded. On the contrary, the cells in which aluminum is exposed to the liquid-contacting portion on the positive electrode side were markedly improved in their discharge capacity and cycle characteristics since such oxidative decomposition was suppressed.

EXAMPLES 14 to 16

LiCoO$_2$ (85 weight parts) as a positive electrode material was added with carbon black (6 weight parts) and polyfluorovinylidene (9 weight parts), and then dispersed with N-methyl-2-pyrrolidone to obtain a slurry. The slurry was uniformly coated on an aluminum foil of 20 µm thick, as a current collector for the positive electrode, dried, and the foil was punched into a predetermined shape to obtain a positive electrode.

On the other hand, artificial graphite powder (product of Timcal America Inc., product name: KS-44) (94 weight parts) as a negative electrode material was mixed with polyfluorovinylidene (6 weight parts), and then dispersed with N-methyl-2-pyrrolidone to obtain a slurry. The slurry was uniformly coated on a copper foil of 18 µm thick, as a current collector for the negative electrode, dried, and the foil was punched into a predetermined shape to obtain a negative electrode.

The electrolytic solution was prepared by using or mixing ethylene sulfite (ES), propylene carbonate (PC) and diethyl carbonate (DEC) at ratios listed in Table 2 and by dissolving thereto a thoroughly dried lithium hexafluorophosphate (LiPF$_6$) as a solute to reach a concentration of 1 mol/litter under a dry argon atmosphere.

Using such positive electrode, negative electrode and electrolytic solution, a coin-shaped nonaqueous electrolytic solution cell as shown in FIG. 1 was fabricated under the dry argon atmosphere. More specifically, a positive electrode 1 and negative electrode 2 were respectively housed in a positive electrode can (outer can) 3 and sealing plate 4, both of which made of stainless steel, and the both were then stacked via a separator 5 made of microporous polyethylene film impregnated with the electrolytic solution. Hereinabove, to compose the liquid-contacting portion on the positive electrode side with a valve metal, the inner wall of the positive electrode can 3 was previously coated with an aluminum foil 6. Thereafter the positive electrode can 3 and sealing plate 4 was crimped together with a gasket 7 to obtain the coin-shaped cell.

Comparative Examples 10

A comparative coin-shaped cell was fabricated in a similar manner with the above Example 14, except for that the inner wall of the positive electrode can 3 was not covered with the aluminum foil.

Comparative Examples 11

A comparative coin-shaped cell was fabricated in a similar manner with the above Example 14, except for that using an electrolytic solution comprising propylene carbonate dissolving LiPF$_6$ at 1 mol/litter.

Figure 4:
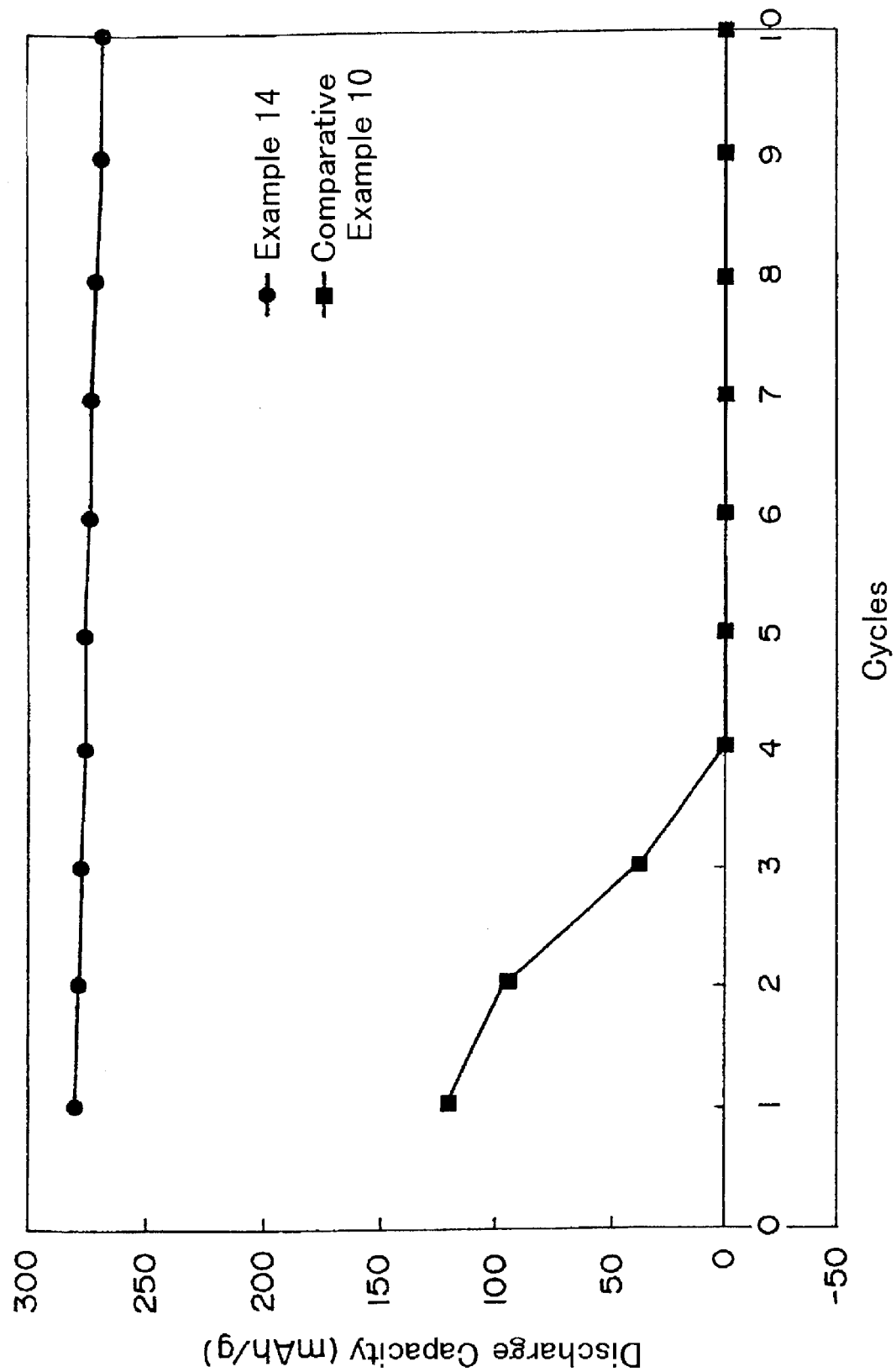
FIG. 4 is a diagram showing relations between charge/discharge characteristics and discharge capacity of nonaqueous electrolytic solution cells of Example 14 of the present invention and Comparative Example 10.

The cells obtained from Examples 14 to 16 and Comparative Examples 10 and 11 were individually subjected to a charge/discharge test at 25° C. with a constant current of 0.5 mA, a charge termination voltage of 4.2 V and a discharge termination voltage of 2.5 V. Charge capacities and discharge capacities at the first cycle of the individual cells were shown in Table 2. Changes in the discharge capacity per unit gram of the negative electrode in relation to the charge/discharge cycles in Example 14 and Comparative Example 10 were shown in FIG. 4.

TABLE 2

|  | Solvent Composition (vol %) | Initial Charge Capacity (mAh/g) | Initial Discharge Capacity (mAh/g) |
| --- | --- | --- | --- |
| Example 14 | ES:PC = 5:95 | 332 | 288 |
| Comparative Example 10 | ES:PC = 5:95 | 429 | 120 |
| Example 15 | ES:PC = 10:90 | 310 | 260 |
| Example 16 | ES:PC:DEC = 10:45:45 | 270 | 182 |
| Comparative Example 11 | PC = 100 | 588 | 0 |

As is clear from the results of Example 14 and Comparative Example 10, the cell in which stainless steel is exposed to the liquid-contacting portion on the positive electrode side failed in obtaining sufficient discharge capacity since the oxidative decomposition reaction of ethylene sulfite contained in the electrolytic solution proceeded. On the contrary, the cell in which aluminum is exposed to the liquid-contacting portion on the positive electrode side was markedly improved in its discharge capacity and cycle characteristics since such oxidative decomposition of ethylene sulfite was suppressed.

Moreover as is clear from the results of Examples 14 to 16 and Comparative Example 11, using propylene carbonate singly as the organic solvent failed in obtaining sufficient discharge capacity since propylene carbonate was decomposed on the surface of the carbonaceous material composing the negative electrode. In contrast to this, adding ethylene sulfite to propylene carbonate markedly improved the discharge capacity and cycle characteristics.

EXAMPLE 17

LiCoO$_2$ (85 weight parts) as a positive electrode material was added with carbon black (6 weight parts) and polyfluorovinylidene (9 weight parts), and then dispersed with N-methyl-2-pyrrolidone to obtain a slurry. The slurry was uniformly coated on an aluminum foil of 20 μm thick, as a current collector for the positive electrode, dried, and the foil was punched into a predetermined shape to obtain a positive electrode.

On the other hand, artificial graphite powder (product of Timcal America Inc., product name: KS-44) (94 weight parts) as a negative electrode material was mixed with polyfluorovinylidene (6 weight parts), and then dispersed with N-methyl-2-pyrrolidone to obtain a slurry. The slurry was uniformly coated on a copper foil of 18 μm thick, as a current collector for the negative electrode, dried, and the foil was punched into a predetermined shape to obtain a negative electrode.

The electrolytic solution was prepared by mixing ethylene sulfite (ES) and propylene carbonate (PC) at a volume ratio of 5:95, and then dissolving thereto a thoroughly dried lithium hexafluorophosphate (LiPF$_6$) to reach a concentration of 1 mol/litter under a dry argon atmosphere.

Using such positive electrode, negative electrode and electrolytic solution, a coin-shaped nonaqueous electrolytic solution cell as shown in FIG. 1 was fabricated under the dry argon atmosphere. More specifically, a positive electrode 1 and negative electrode 2 were respectively housed in a positive electrode can (outer can) 3 and sealing plate 4, both of which made of stainless steel, and the both were then stacked via a separator 5 made of microporous polyethylene film impregnated with the electrolytic solution. Hereinabove, to compose the liquid-contacting portion on the positive electrode side with a valve metal, the inner wall of the positive electrode can 3 was previously coated with an aluminum foil 6. Thereafter the positive electrode can 3 and sealing plate 4 was crimped together with a gasket 7 to obtain the coin-shaped cell.

Figure 5:
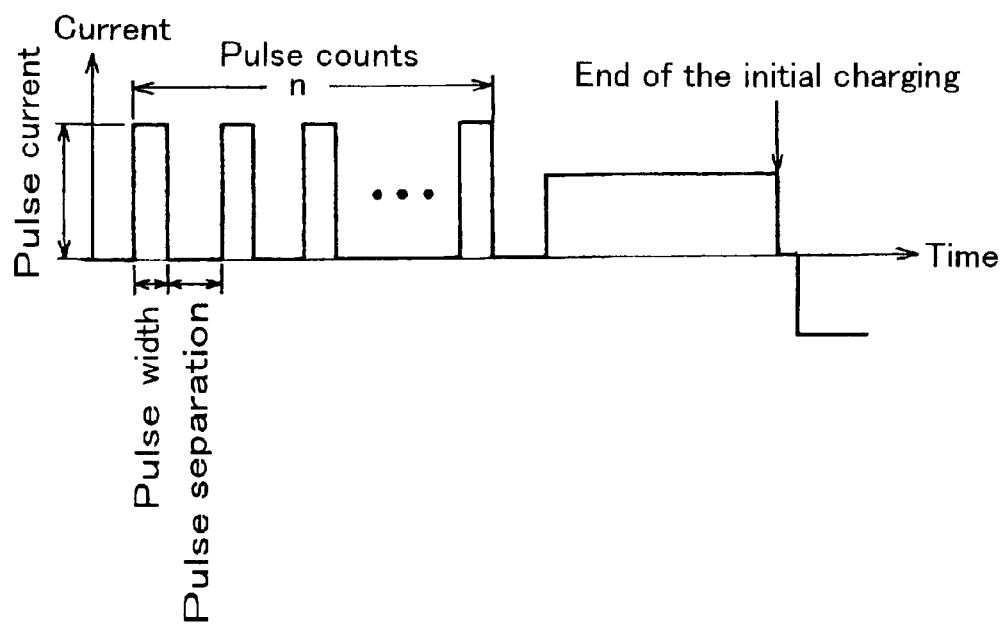
FIG. 5 is a diagram showing a specific example of current pulse applied at the initial charging.

The obtained cell was then subjected to the initial charging by applying current pulses having a rectangular waveform as shown in FIG. 5. Current pulses applied was such that having a pulse current per one gram of the negative electrode material of 0.1 A/g, a pulse width of 60 seconds, a pulse separation of 300 seconds, and a pulse count of 60 counts.

EXAMPLES 18 to 24

A coin-shaped cell was fabricated by the same process as described in Example 17. In Examples 18 and 19, the initial charging was performed using a constant current of 0.1 A/g and 0.4 A/g, respectively, in place of using the current pulses. In Examples 20 to 24, a coin-shaped cell was fabricated in which the composition of the electrolytic solution and the current pulses applied at the initial charging were altered as listed in Table 3.

Figure 6:
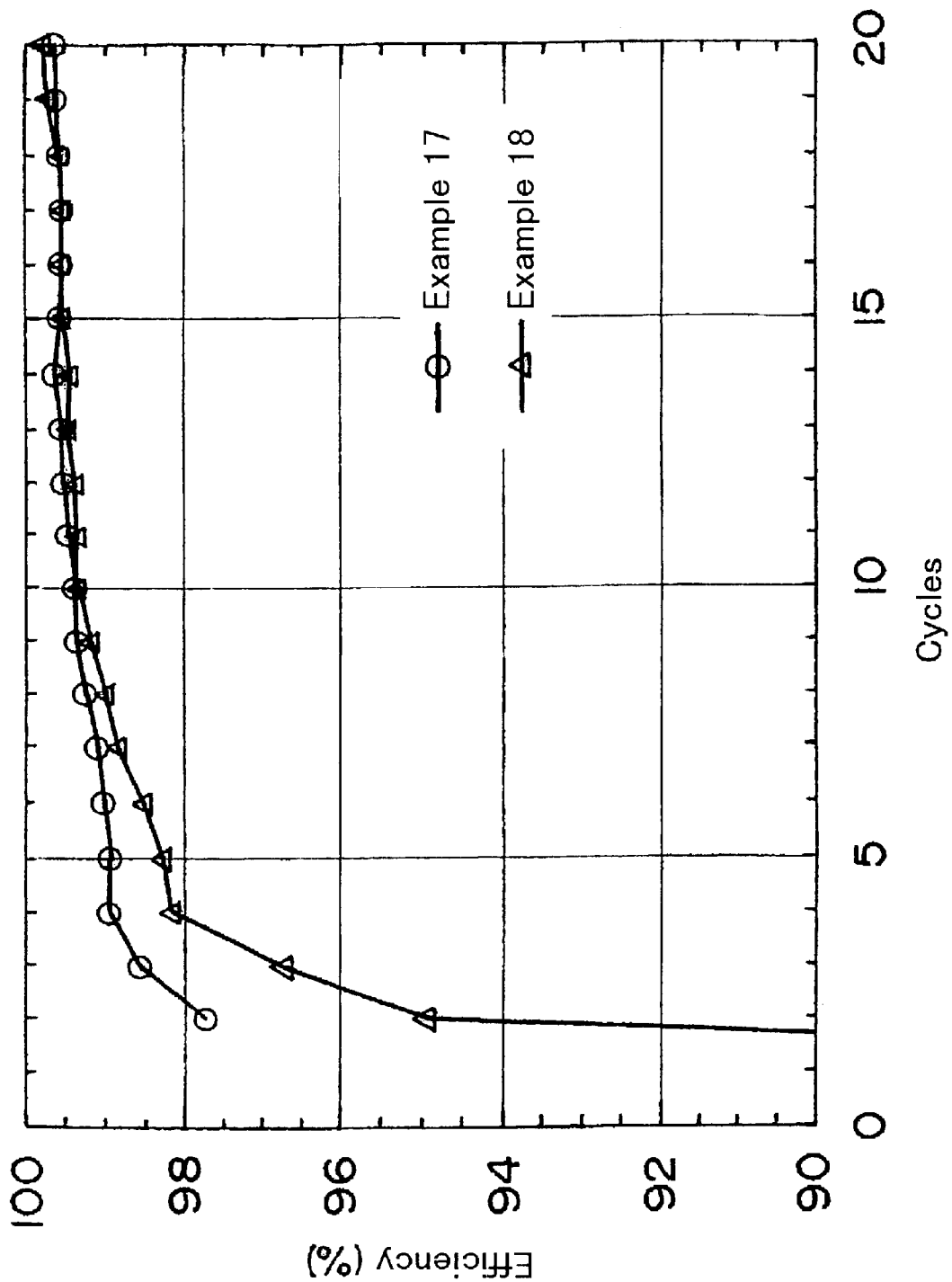
FIG. 6 is a diagram showing relations between charge/discharge cycle and charge/discharge efficiency of nonaqueous electrolytic solution cells of Examples 17 and 18 of the present invention.

The cells obtained from Examples 17 to 24 were individually subjected to a charge/discharge test up to 100 cycles at 25° C. with a constant current per one gram of the negative electrode material of 0.1 A/g, a charge termination voltage of 4.2 V and a discharge termination voltage of 2.5 V. Discharge capacities per one gram of the negative electrode at the 5th cycle, and retention ratios of discharge capacities at the 5th and 100th cycles were shown in Table 3. Changes in the discharge capacities per one gram of the negative electrode in relation to the charge/discharge cycles up to 20 cycles in Examples 17 and 18 were shown in FIG. 6.

TABLE 3

| | Composition of the Electrolytic Solution (Upper) Solute (Lower) Solvent | Current Pulse at the Initial Charging | | | | Discharge Capacity at the 5th cycle (mAh/g) | Retention Ratio of Discharge Capacity at to 100th cycle (%) |
|---|---|---|---|---|---|---|---|
| | | Current (A/g) | Width (sec) | Separation (sec) | Count (Count) | | |
| Example 17 | LiPF$_6$ ES:PC = 5:95 | 0.1 | 60 | 300 | 60 | 200 | 93.0 |
| Example 18 | LiPF$_6$ ES:PC = 5:95 | No current pulse. Initially charged with a 0.1 A/g constant current. | | | | 198 | 89.1 |
| Example 19 | LiPF$_6$ ES:PC = 5:95 | No current pulse. Initially charged with a 0.4 A/g constant current. | | | | 200 | 82.5 |
| Example 20 | LiPF$_6$ ES:PC = 10:90 | 0.4 | 5 | 25 | 120 | 224 | 96.4 |
| Example 21 | LiPF$_6$ ES:PC = 10:90 | 1.0 | 1 | 10 | 70 | 234 | 96.2 |
| Example 22 | LiPF$_6$ ES:PC = 10:90 | 1.0 | 1 | 20 | 250 | 226 | 95.6 |
| Example 23 | LiPF$_6$ ES:PC = 10:90 | 2.0 | 0.1 | 20 | 120 | 320 | 97.8 |
| Example 24 | LiN(CF$_3$CF$_2$SO$_2$)$_2$ ES:PC = 10:90 | 1.0 | 1 | 20 | 250 | 238 | 92.9 |

(Note)
Concentrations of the solute in the electrolytic solution is 1M in all cases.

As is clear from Table 3, the initial capacity and the retention ratio of the capacity in the cycle test were further improved by applying the current pulses at the initial charging. It was also made clear from FIG. 6 that the charge/discharge efficiency of the cell was further improved by applying the current pulses at the initial charging.

Industrial Applicability

By selecting compounds represented by the formula (1) as an organic solvent for the electrolytic solution, and by using valve metal or alloy thereof for composing the current collector for the positive electrode and the liquid-contacting portion on the positive electrode side of the outer can, it becomes possible to obtain a nonaqueous electrolytic solution cell excellent in low-temperature characteristics and long-term stability, and also in cycle characteristics particularly for use as a secondary battery. The nonaqueous electrolytic solution cell is widely applicable to, for example, electric appliances and energy storage facility.

What is claimed is:

1. A nonaqueous electrolytic solution cell comprising a negative electrode containing lithium as an active material, a positive electrode, a nonaqueous electrolytic solution consisting of a solute and an organic solvent, a separator, and an outer can;

wherein the nonaqueous electrolytic solution contains at least one organic solvent represented by the formula (1):

    R$_1$—A—R$_2$          (1)

in which,
    R$^1$ and R$^2$ independently represent an alkyl group which may be substituted with an aryl group or halogen atom; an aryl group which may be substituted with an alkyl group or halogen atom; or may be taken together to form, together with —A—, a cyclic structure which may contain an unsaturated bond, where "A" is represented by a formula selected from the group consisting of:

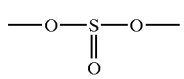 (2)

 (3)

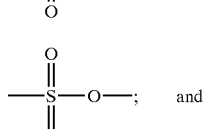 and (4)

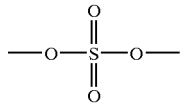 (5)

wherein a current collector for the positive electrode is made of valve metal or an alloy thereof and
    wherein a portion of the outer can contacting the electrolytic solution at the side of the positive electrode is made of valve metal or an alloy thereof.

2. A nonaqueous electrolytic solution cell of claim 1, wherein R$_1$ and R$_2$ of the compound represented by the formula (1) independently represent an alkyl group having 1 to 4 carbon atoms which may be substituted with a phenyl group or a halogen atom; or a phenyl group which may be substituted with a halogen atom; or may be taken together to form, together with —A—, a cyclic structure which may contain an unsaturated bond.

3. A nonaqueous electrolytic solution cell of claim 1, wherein "A" in the formula (1) has a structure represented by the formula (2).

4. A nonaqueous electrolytic solution cell of claim 1, wherein "A" in the formula (1) has a structure represented by the formula (3).

5. A nonaqueous electrolytic solution cell of claim 1, wherein "A" in the formula (1) has a structure represented by the formula (4).

6. A nonaqueous electrolytic solution cell of claim 1, wherein "A" in the formula (1) has a structure represented by the formula (5).

7. A nonaqueous electrolytic solution cell of claim 1, wherein at least one compound selected from the group consisting of ethylene sulfite, dimethyl sulfite, sulfolane, sulfolene and 1,3-propanesultone is contained as the organic solvent.

8. A nonaqueous electrolytic solution cell of claim 7, wherein ethylene sulfite and propylene carbonate are contained as the organic solvent.

9. A nonaqueous electrolytic solution cell of claim 1, wherein the solute is at least one lithium salt selected from the group consisting of $LiClO_4$, $LiPF_6$, $LIBF_4$, $LiCF_3SO_3$, $LiN(CF_3SO_2)_2$, $LiN(CF_3CF_2SO_2)_2$, $LiN(CF_3SO_2)(C_4F_9SO_2)$ and $LiC(CF_3SO_2)_3$.

10. A nonaqueous electrolytic solution cell of claim 1, wherein a concentration of the solute in the nonaqueous electrolytic solution is within a range from 0.5 to 2.0 mol/liter.

11. A nonaqueous electrolytic solution cell of claim 1, wherein the valve metal or alloy thereof is selected from the group consisting of Al, Ti, Zr, Hf, Nb, Ta and alloys containing these metals.

12. A nonaqueous electrolytic solution cell of claim 11, wherein the valve metal or alloy thereof is Al or Al alloy.

13. A nonaqueous electrolytic solution cell of claim 1, wherein the negative electrode contains at least one material selected from the group consisting of carbonaceous materials capable of occluding and liberating lithium, metal oxide materials capable of occluding and liberating lithium, lithium metal and lithium alloys.

14. A nonaqueous electrolytic solution cell of claim 13, wherein the negative electrode contains graphite.

15. A nonaqueous electrolytic solution cell of claim 14, wherein the negative electrode consists of a carbonaceous material having a "d" value for lattice plane (002) in X-ray diffractometry of 0.335 to 0.37 nm.

16. A nonaqueous electrolytic solution cell of claim 15, wherein the negative electrode consists of a carbonaceous material having a "d" value for lattice plane (002) in X-ray diffractometry of 0.335 to 0.34 nm.

17. A nonaqueous electrolytic solution cell of claim 1, wherein the positive electrode contains at least one material selected from the group consisting of lithium-transition metal composite oxide material capable of occluding and liberating lithium; transition metal oxide material capable of occluding and liberating lithium; and carbonaceous material.

18. A nonaqueous electrolytic solution cell of claim 1, wherein the cell is a secondary battery.

19. A nonaqueous electrolytic solution cell of claim 18, wherein the cell is applied with current pulses at the initial charging.

20. A nonaqueous electrolytic solution cell of claim 19, wherein the current pulses are of rectangular wave with a constant current value per one gram of active material for the negative electrode of 0.01 to 100 A/g, a pulse width of 0.01 to 300 seconds, a pulse separation of 0.1 to 300 seconds, and a pulse count of 10 to 1000 counts.

21. The nonaqueous electrolytic solution cell of claim 1, wherein the organic solvent is a mixture of cyclic sulfite and propylene carbonate.

22. A nonaqueous electrolytic solution cell of claim 1, wherein a portion of the outer can contacting the electrolytic solution at the side of the negative electrode is made of at least one of copper, nickel or stainless steel.

23. A nonaqueous electrolytic solution cell of claim 1, wherein a portion of the outer can contacting the electrolytic solution at the side of the negative electrode is made of stainless steel.

24. A nonaqueous electrolytic solution cell of claim 1, wherein the outer can at the side of the positive electrode is made of Al or an Al alloy.

25. A nonaqueous electrolytic solution cell comprising a negative electrode containing lithium as an active material, a positive electrode, a nonaqueous electrolytic solution consisting of solute and organic solvent, a separator, and an outer can;

wherein 0.05 vol% or more of the organic solvent is at least one compound selected from the group consisting of ethylene sulfite, dimethyl sulfite, sulfolane, sulfolene and 1,3-propanesultone, wherein a current collector for the positive electrode is made of Al or Al alloy, and wherein the outer can at the side of the positive electrode is made of Al or an Al alloy.

26. A nonaqueous electrolytic solution for a nonaqueous electrolytic solution cell:

wherein the nonaqueous electrolytic solution consists of solute and organic solvent and the nonaqueous electrolytic solution contains at least one organic solvent represented by the formula (1):

$$R_1-A-R_2 \quad (1)$$

in which, $R_1$ and $R_2$ independently represent an alkyl group which may be substituted with an aryl group or halogen atom; an aryl group which may be substituted with an alkyl group or halogen atom; or may be taken together to form, together with -A-, a cyclic structure which may contain an unsaturated bond, where "A" is represented by a formula selected from the group consisting of:

(2)

(3)

(4)

-continued

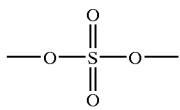  (5)

wherein the nonaqueous electrolytic solution cell comprises a negative electrode containing lithium as an active material, a positive electrode, a separator and an outer can, wherein a current collector for the positive electrode is made of valve metal or an alloy thereof, and wherein a portion of the outer can contacting the electrolytic solution at the side of the positive electrode is made of valve metal or an alloy thereof.

27. A nonaqueous electrolytic solution for a nonaqueous electrolytic solution cell:

wherein the nonaqueous electrolytic solution consists of solute and organic solvent and 0.05 vol% or more of the organic solvent is at least one compound selected from the group consisting of ethylene sulfite, dimethyl sulfite, sulfolane, sulfolene and 1,3-propanesultone;

wherein the nonaqueous electrolytic solution cell comprises a negative electrode containing lithium as an active material, a positive electrode, a separator and an outer can, wherein a current collector for the positive electrode is made of Al or an Al alloy, and wherein the outer can at the side of the positive electrode is made of Al or an Al alloy.

* * * * *